United States Patent [19]

Weber

[11] Patent Number: 5,207,149
[45] Date of Patent: May 4, 1993

[54] APPARATUS FOR THE PREPARATION OF HOT DRINKS

[75] Inventor: René Weber, Rothrist, Switzerland

[73] Assignee: Eldom Rothrist AG, Rothrist, Switzerland

[21] Appl. No.: 786,375

[22] Filed: Nov. 1, 1991

[30] Foreign Application Priority Data

Nov. 2, 1990 [CH] Switzerland .................. 3485/90

[51] Int. Cl.⁵ .......................................... A47J 31/46
[52] U.S. Cl. ...................................... 99/293; 99/300; 137/595; 137/863
[58] Field of Search ............ 99/295, 300, 299, 302 R, 99/303, 304, 305, 306, 307, 316, 293; 137/595, 863, 636.1, 625.46; 251/331

[56] References Cited

U.S. PATENT DOCUMENTS

| | | | |
|---|---|---|---|
| 3,991,788 | 11/1976 | Kull | 137/863 |
| 4,947,738 | 8/1990 | Eugster | 99/300 |
| 5,113,906 | 5/1992 | Högner | 137/863 |

FOREIGN PATENT DOCUMENTS 0458881 8/1950 Italy .................................. 187/863

Primary Examiner—Philip R. Coe
Assistant Examiner—Reginald L. Alexander
Attorney, Agent, or Firm—Tarrolli, Sundheim & Covell

[57] ABSTRACT

Apparatuses for the preparation of different hot drinks, such as in particular espresso machines, conventionally have a multiway valve (2), which is used for supplying hot water or superheated steam produced in a water heater to different means, such as coffee filters, frothing nozzle and/or collecting vessels. As a result of high temperatures and pressures the multiway valve is exposed to considerable stresses, which in the long term cannot be withstood by known valves or only when a complicated and costly construction is adopted. In the novel apparatus the multiway valve is provided with a perforated disk (8) and a rotary control dial (9). Rods (14) for closing the distributing passages (5) are passed through the holes in the perforated disk. The distributing passages are provided in a distributing block (1) to which the multiway valve is flanged. The position of the rods is determined by the rotary position of the control dial provided with a guide link for the rods.

19 Claims, 2 Drawing Sheets

APPARATUS FOR THE PREPARATION OF HOT DRINKS

TECHNICAL FIELD

The present invention relates to an apparatus for preparing hot drinks with a multiway valve flanged to a distributing block, which is provided with a feed passage for hot water or superheated steam to the multiway valve and distributing passages emanating therefrom and leading to different means, such as coffee filters, frothing nozzle and/or residual water collecting vessels, the multiway valve being provided with a perforated disk and a rotary control dial.

Such apparatuses are e.g. known in the form of espresso machines. The multiway and generally 4/3-way valves used therein, are used in a first position to supply the water heated in a water heater to the ground coffee for preparing espresso or in another position for supplying superheated steam to the frothing nozzle for heating and frothing milk for the subsequent preparation of cappuccino. A third and normally central position is used for venting the apparatus. In the latter position any superheated steam still present in the water heater can expand and flow as residual water into a collecting vessel.

Due to the necessarily high temperatures (of well over 100° C.) and pressures (of over 15 bar) the multiway valve is exposed to severe stresses and is subject to pronounced wear. As a component with movable parts its operation is in particular endangered by calcareous deposits.

EP 0 307 497 Al discloses an apparatus of the aforementioned type, in which the multiway valve is constructed as a ceramic valve with closely superimposed, but reciprocally movably ceramic disks provided with distributing passages. In order to obtain an easy operation of the valve, the surfaces of the ceramic disks are worked in an expensive manner and grease pockets are provided between them.

DESCRIPTION OF THE INVENTION

The problem of the invention is to improve an apparatus of the aforementioned type in such a way that, without complicated surface treatment to its parts or lubrication, the multiway valve can reliably operate over a long period of time.

According to the invention this problem is solved by an apparatus with the features of claim 1.

Thus, according to the invention, through the holes of the perforated disk are passed rods for closing the distributing passages and the position thereof is determined by the rotation position of the control dial provided with a guide link.

Advantageous further developments of the invention are characterized in the dependent claims.

BRIEF DESCRIPTION OF THE DRAWINGS

Further developments of the invention can be gathered from the following explanation of an inventive apparatus, using the example of an espresso machine, and with reference to the attached drawings, wherein show.

The same reference numerals designate the same parts throughout the drawings.

WAY TO PERFORM THE INVENTION

Figure 1:
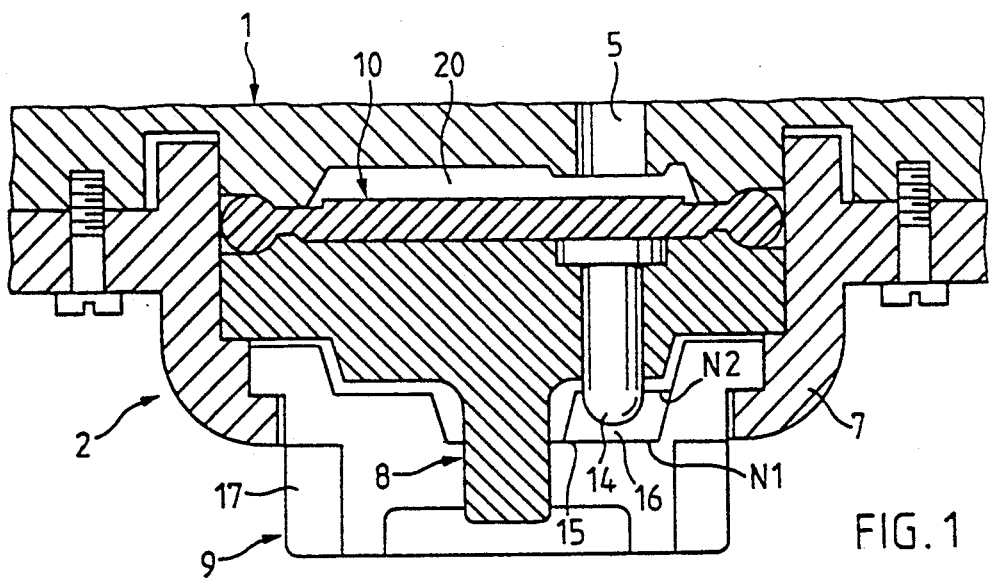
FIG. 1 A sectional representation of a multiway valve flanged to a distributing block of an espresso machine in a construction according to the invention and a first position.

In the drawings 1 is a distributing block of an espresso machine to which is flanged a multiway valve 2, which as four connections and three positions. It is used for supplying either to the coffee filter, the frothing nozzle or the collecting vessel of the expresso machine the hot water produced in a heater. As the construction of the heater, the coffee filter, the frothing nozzle, the collecting vessel and the remaining parts of the espresso machine are unimportant here, they are not shown so as not to overburden the drawings.

Figure 4:
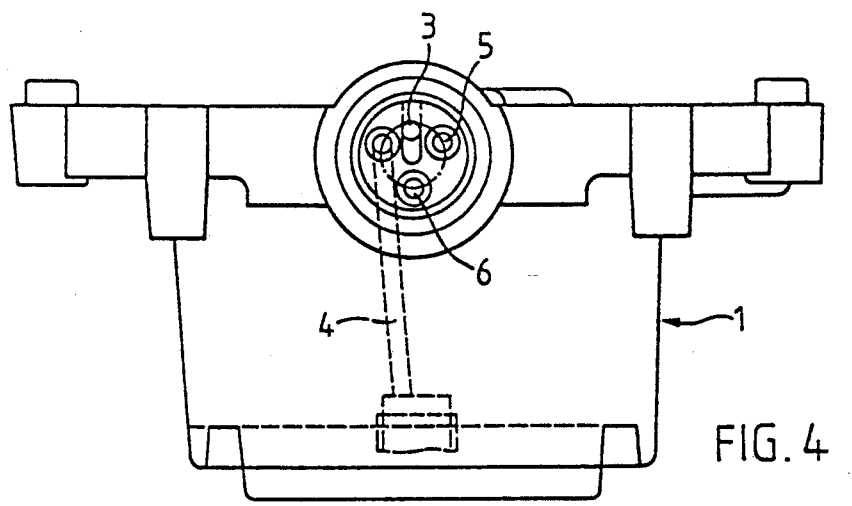
FIG. 4 A view of the end of the distributing block to which the multiway valve is flanged.
Figure 5:
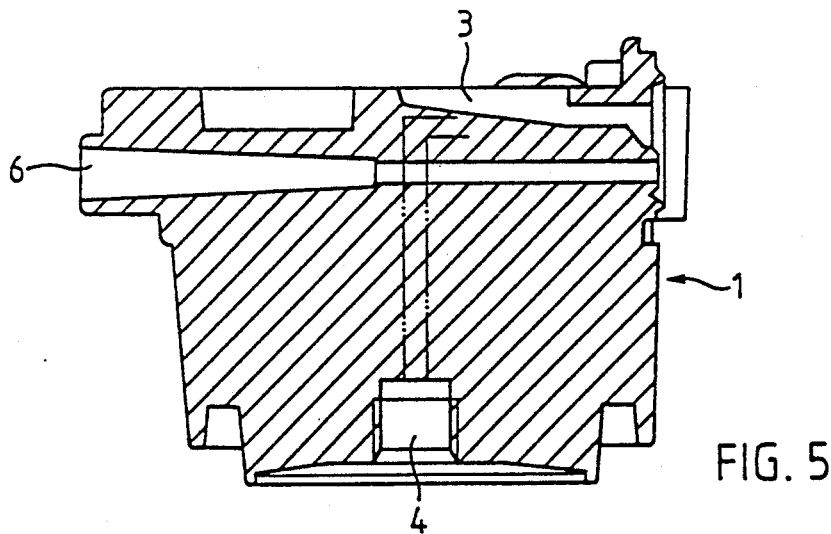
FIG. 5 A longitudinal section through the same distributing block.

Passages are provided in the distributing block 1 for the passage of the hot water or superheated steam (FIGS. 4 and 5). A first passage 3 is used for supplying hot water or superheated steam from the heater to the multiway valve 2, from which emanate distributing passages 4, 5, 6 to the coffee filter, the frothing nozzle and the collecting vessel. As can be seen in FIG. 4, the distributing passages 4, 5 and 6 end at the multiway valve 2 on a radius with the opening of the feed passage 3 as the centre point.

In its casing 7 screwed to the distributing block 1 the multiway valve 2 has a perforated disk 8 and a control dial 9. A distributing chamber 20 is formed between the perforated disk 8 and the distributing block 1 and into it issues the feed passage 3 and from it emanate the distributing passages 4, 5 and 6. The perforated disk 8 is sealed against the distributing casing outside the distributing chamber by means of a diaphragm 10 sealing in its marginal area. Whereas the perforated disk is fixed in non-rotary manner in the valve casing 7, the control dial 9 can be rotated therein and consequently relative to the perforated disk 8.

Figure 2:
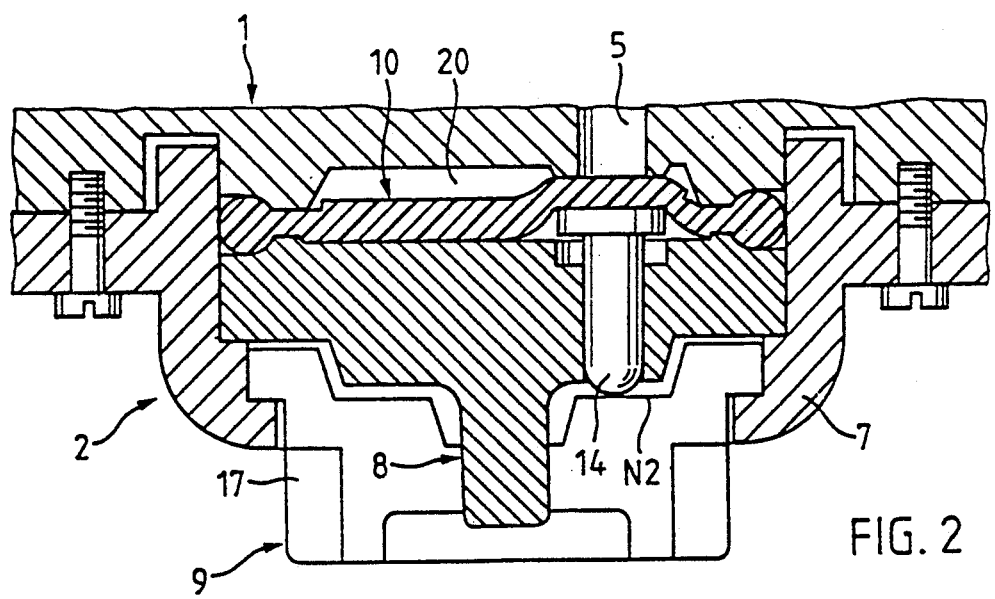
FIG. 2 In the same representation the multiway valve in a different position.
Figure 3:
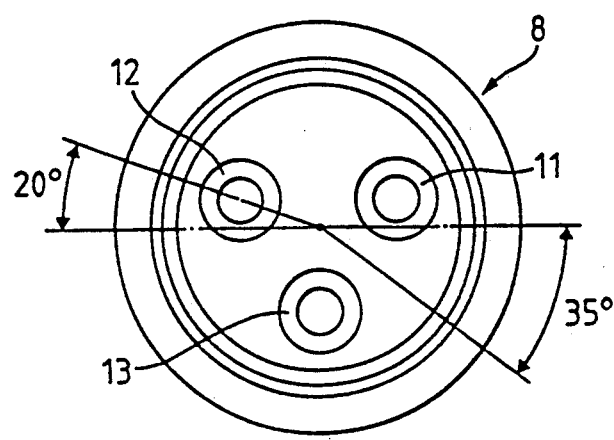
FIG. 3 A plan view of the perforated disk of the multiway valve.

The perforated disk 8 is provided with three through holes 11, 12 and 13 through which are passed in axially movable manner rods. The rods are used for closing or sealing the openings of the distributing passages 4, 5 and 6 and are consequently positioned congruently with said openings. Only one of the rods is shown in FIGS. 1 and 2 and is designated by the reference numeral 14.

The rods 14 can be completely lowered into the perforated disk 8, but only to the extent that their head end terminates roughly flush with the distributing block-side surface of the perforated disk 8. This is achieved by a progression of its diameter, as well as a corresponding progression of the diameter of the perforated disk holes.

The rods 14 are somewhat longer than the perforated disk holes 11 to 13. Thus, if their head end is completely embedded in the perforated disk, their base end projects by a small amount towards the control dial 9 out of the perforated disk 8.

Figure 6:
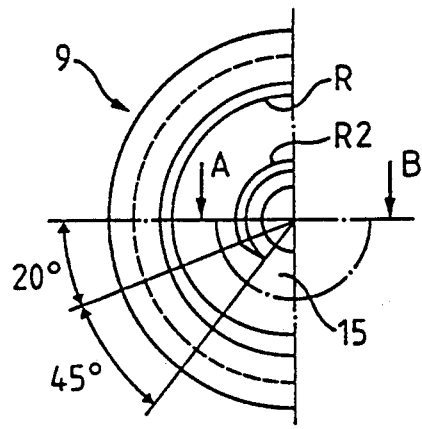
FIG. 6 A plan view of the multiway valve control dial.
Figure 7:
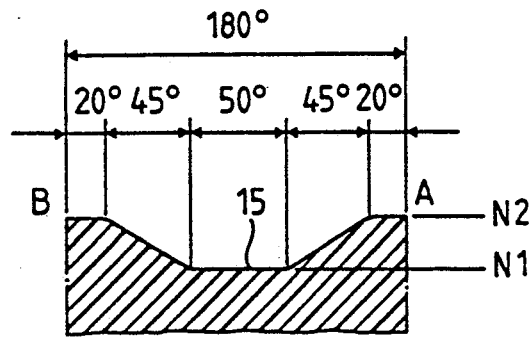
FIG. 7 A section through the control dial along the circular line between A and B in FIG. 6.

The axial position of the rods 14 in the holes 11 to 13 of the perforated disk 8 is determined by the rotary position of the control dial 9. Its side facing the perforated disk 8 is provided for this purpose with a torus between two radii R1 and R2 having a guide link for the rods 14. The construction of the guide link is shown in FIGS. 6 and 7. In the sector designated 15 of the torus bounded by the radii R1 and R2 is provided a depression. Inclined sides are provided in the transition area between the torus levels designated N1 and N2 in FIG. 7. The centre angle of the sector 15 is only 50°.

As a result of this guide link construction, there are in each case at least two of the rods 14 with their base end engaging on the non-depressed part of the guide link. Thus, the head end thereof projects over the distributing block-side surface of the perforated disk 8 and keep the diaphragm 10 in sealing engagement on the openings of the distributing passages, as is the case at rod 14 in FIG. 2. At the most one of the three rods 14, namely that which coincides with the said depression (sector 15) in the guide link of the control dial can, accompanied by the freeing of the opening of the distributing passage associated with it and therefore the opening of a flow path in the distributing chamber 20 between the centrally arranged feed passage 3 and said distributing passage, be completely lowered into the perforated disk 8, as is the case with the rod in FIG. 1. As can also be seen in FIG. 1, the rod completely lowered into the perforated disk does not engage on the guide link. The level N1 of the depression in the guide link is, in view of the fact that during the operation of the espresso machine a much higher pressure is exerted on this rod than on the two others, is deliberately made so low that a gap 16 is left between the rod and the bottom of the depression. Therefore the control disk 9 does not have to absorb the aforementioned high pressure, which acts on the rod completely lowered into the perforated disk 8. This significantly contributes to the easy action and durability of the multiway valve.

In control dial rotation positions between those in which one of the distributing passages 4, 5 or 6 is open, all three distributing passages are closed as a result of the above-described guide link construction.

The control dial 9 is also constructed in such a way that it can be rotation-coupled to a not shown manually operable knob and which preferably simultaneously serves as an on/off switch for the electrical components of the espresso machine, e.g. the pressure pump, etc. To this end the control dial 9 has a part projecting outwards through an opening in the valve casing 7 and which is provided with a tooth system 17. To facilitate handling between the knob and the control dial there can be a translation from smaller to larger rotation angles. In order to rotate the control dial between two positions by approximately 110°, as is necessary in the present example, it is then e.g. merely necessary, as a function of the translation, to only turn the knob by approximately 45°.

As can be seen in FIG. 4 two of the distributing passages, namely the passages 4 and 5 leading to the coffee filter and the frothing nozzle, pass to the right and left from the central feed passage 3, whilst the third passage 6 leading to the collecting vessel passes out below the central feed passage 3. This arrangement leads to a basic position of the control dial 9, in which the depression in its guide link coincides with the last-mentioned distributing passage 6 leading to the collecting vessel and is consequently connected to the central feed passage 3, whilst the two other distributing passages are closed. As in this position of the control dial 9 the heater is open to the surrounding area and vented, the pressure pump must be electrically switched off in this position.

For preparing coffee or operating the frothing nozzle (hot water or superheated steam), e.g. by turning the knob coupled to the control dial 9 the latter is moved from its basic position to either the left or right, so that either the distributing passage leading to the coffee filter or that leading to the frothing nozzle is opened and simultaneously the pressure pump is switched on.

At the end of coffee preparation, hot water preparation or the frothing process the control dial 9 is turned back into its basic position, in which the pressure pump is again switched off and the heater is vented. Any residual water or superheated steam in the heater is then ejected to the collecting vessel.

I claim:

1. Apparatus for the preparation of hot drinks and in particular for an espresso machine, said apparatus comprising:

a distributing block with a feed duct for feeding hot water or superheated steam and a plurality of distributing ducts for distributing said hot water or superheated steam to other parts of said apparatus, said feed duct ending with an opening at and said distributing ducts emanating with an opening from a common plane which is located at the outside of said distributing block; and a multiway valve for selectably connecting said feed duct to one of said distributing ducts, said multiway valve including a valve housing which is flanged to said distributing block, thereby covering said common plane and defining together with said common plane a valve chamber;

said multiway valve including a disk separate from said valve housing and located within said valve housing, said disk having a first main surface and a second main surface opposite to said first main surface, said disk having a thickness, a normal direction, and a plurality of through holes extending through said disk parallel to said normal direction, said disk being fixedly mounted within said valve housing at a distance from said common plane and with said normal direction extending perpendicular to said common plane, said first main surface of said disk and said common plane together defining a distribution chamber, each of said through holes being in alignment with one of said emanating distributing ducts;

said multiway valve including a plurality of valve rods, each valve rod being slideably mounted within one of said through holes, each valve rod having a length which is greater than said disk thickness, said valve rod closing said opening of the respective one of said distributing ducts when said valve rod is slid in the respective one of said through holes towards said common plane;

said multiway valve including a plate cam located within said valve housing, said plate cam being rotatably mounted between said second main surface of said disk and said valve housing, said plate cam including a guide link for said valve rods, the position of each of said valve rods being determined by the rotary position of said plate cam.

2. Apparatus according to claim 1, wherein said first main surface of said disk is covered by an elastic diaphragm which presses against said disk and said valve housing to seal said distribution chamber, said diaphragm sealing one of said openings of said distributing ducts when the respective one of said valve rods slides towards said common plane.

3. Apparatus according to claim 2, wherein said elastic diaphragm is flat within an area corresponding to said common plane and has a sealing ring integrated at its circumference.

4. Apparatus according to claim 1, wherein at the side of said common plane each of said valve rods is provided with an end part of greater diameter and each of said through holes is provided with a recess corresponding to said end part of said valve rod, each of said valve rods being lowerable into said disk only to the extent that it terminates flush with said first main surface of said disk.

5. Apparatus according to claim 1, wherein each of said valve rods rests in a lower position when the respective one of said openings of said distributing ducts is opened, and wherein said guide link of said plate cam is provided with at least one depressed sector for allowing one of said valve rods to rest in said lower position, said sector having a depth which is great enough such that said resting valve rod is spaced apart from said plate cam.

6. Apparatus according to claim 5, wherein said at least one depressed sector has a symmetrical form with respect to a rotation of said plate cam, said plate cam being rotatable in both directions to operate said valve rods.

7. Apparatus according to claim 1, wherein said valve housing has an opening through which said plate cam can be operated from outside said valve housing.

8. Apparatus according to claim 7, wherein a part of said plate cam projects outwards from said valve housing through said valve housing opening, and wherein said projecting part of said plate cam is constructed as a gear wheel and is part of a gear.

9. Apparatus according to claim 1, wherein said plate cam is rotatably mounted about an axis of a central hole, and wherein said axis is an integral part of said disk and projects from said second main surface outwards.

10. Apparatus for the preparation of hot drinks and in particular for an espresso machine, said apparatus comprising:
a distributing block with a feed duct for feeding hot water or superheated steam and a plurality of distributing ducts for distributing said hot water or superheated steam to other parts of said apparatus, said feed duct ending with an opening at and said distributing ducts emanating with an opening from a common plane which is located at the outside of said distributing block; and
a multiway valve for selectably connecting said feed duct to one of said distributing ducts, said multiway valve including a valve housing which is flanged to said distributing block, thereby covering said common plane and defining together with said common plane a valve chamber;
said multiway valve including a disk separate from said valve housing and located within said valve housing, said disk having a first main surface and a second main surface opposite to said first main surface, said disk having a thickness, a normal direction, and a plurality of through holes extending through said disk parallel to said normal direction, said disk being fixedly mounted within said valve housing at a distance from said common plane and with said disk normal direction extending perpendicular to said common plane, said first main surface of said disk and said common plane together defining a distribution chamber, each of said through holes being in alignment with one of said emanating distributing ducts;
said multiway valve including a plurality of valve rods, each valve rod being slideably mounted within one of said through holes, each valve rod having a length which is greater than said disk thickness, said valve rod closing said opening of the respective one of said distributing ducts when said valve rod is slid in the respective one of said through holes towards said common plane;
said multiway valve including a plate cam located within said valve housing, said plate cam being rotatably mounted between said second main surface of said disk and said valve housing, said plate cam including a guide link for said valve rods, the position of each of said valve rods being determined by the rotary position of said plate cam;
said valve housing having an opening through which said plate cam can be operated from outside said valve housing, a part of said plate cam projecting outwards from said valve housing through said valve housing opening, said projecting part of said plate cam being constructed as a gear wheel and being part of a gear;
said plate cam being rotatably mounted about an axis of a central hole, said axis being an integral part of said disk and projecting from said second main surface outwards.

11. Apparatus according to claim 10, wherein said first main surface of said disk is covered by an elastic diaphragm which presses against said disk and said valve housing to seal said distribution chamber, said diaphragm sealing one of said openings of said distribution ducts when the respective one of said valve rods slides towards said common plane.

12. Apparatus according to claim 11, wherein said elastic diaphragm is flat within an area corresponding to said common plane and has a sealing ring integrated at its circumference.

13. Apparatus according to claim 10, wherein at the side of said common plane each of said valve rods is provided with an end part of greater diameter and each of said through holes is provided with a recess corresponding to said end part of said valve rod, each of said valve rods being lowerable into said disk only to the extent that it terminates flush with said first main surface of said disk.

14. Apparatus according to claim 10, wherein each of said valve rods rests in a lower position when the respective one of said openings of said distributing ducts is opened, and wherein said guide link of said plate cam is provided with at least one depressed sector for allowing one of said valve rods to rest in said lower position, said sector having a depth which is great enough such that said resting valve rod is spaced apart from said plate cam.

15. Apparatus according to claim 14, wherein said at least one depressed sector has a symmetrical form with respect to a rotation of said plate cam, said plate cam being rotatable in both directions to operate said valve rods.

16. Apparatus for the preparation of hot drinks and in particular for an espresso machine, said apparatus comprising:
a distributing block with a feed duct for feeding hot water or superheated steam and a plurality of distributing ducts for distributing said hot water or superheated steam to other parts of said apparatus, said feed duct ending with an opening at and said distributing ducts emanating with an opening from a common plane which is located at the outside of said distributing block; and a multiway valve for selectably connecting said feed duct to one of said distributing ducts, said multiway valve including a valve housing which is flanged to said distributing block, thereby covering said common plane and defining together with said common plane a valve chamber;

said multiway valve including a disk separate from said valve housing and located within said valve housing, said disk having a first main surface and a second main surface opposite to said first main surface, said disk having a thickness, a normal direction, and a plurality of through holes extending through said disk parallel to said normal direction, said disk being fixedly mounted within said valve housing at a distance from said common plane and with said normal direction extending perpendicular to said common plane, said first main surface of said disk and said common plane together defining a distribution chamber, each of said through holes being in alignment with one of said emanating distributing ducts;

said multiway valve including a plurality of valve rods, each valve rod being slideably mounted within one of said through holes, each valve rod having a length which is greater than said disk thickness, said valve rod closing said opening of the respective one of said distributing ducts when said valve rod is slid in the respective one of said through holes towards said common plane;

said multiway valve including a plate cam located within said valve housing, said plate cam being rotatably mounted between said second main surface of said disk and said valve housing, said plate cam including a guide link for said valve rods, the position of each of said valve rods being determined by the rotary position of said plate cam;

said valve housing having an opening through which said plate cam can be operated from outside said valve housing, a part of said plate cam projecting outwards from said valve housing through said valve housing opening, said projecting part of said plate cam being constructed as a gear wheel and being part of a gear;

said plate cam being rotatably mounted about an axis of a central hole, said axis being an integral part of said disk and projecting from said second main surface outwards;

each of said valve rods resting in a lower position when the respective one of said openings of said distributing ducts is opened, said guide link of said plate cam being provided with at least one depressed sector for allowing one of said valve rods to rest in said lower position, said sector having a depth which is great enough such that said resting valve rod is spaced apart from said plate cam;

said at least one depressed sector having a symmetrical form with respect to a rotation of said plate cam, said plate cam being rotatable in both directions to operate said valve rods.

17. Apparatus according to claim 16, wherein said first main surface of said disk is covered by an elastic diaphragm which presses against said disk and said valve housing to seal said distribution chamber, said diaphragm sealing one of said openings of said distributing ducts when the respective one of said valve rods slides towards said common plane.

18. Apparatus according to claim 17, wherein said elastic diaphragm is flat within an area corresponding to said common plane and has a sealing ring integrated at its circumference.

19. Apparatus according to claim 16 wherein at the side of said common plane each of said valve rods is provided with an end part of greater diameter and each of said through holes is provided with a recess corresponding to said end part of said valve rod, each of said valve rods being lowerable into said disk only to the extent that it terminates flush with said first main surface of said disk.

* * * * *